(12) United States Patent
Ito et al.

(10) Patent No.: US 10,197,879 B2
(45) Date of Patent: *Feb. 5, 2019

(54) LIQUID CRYSTAL DISPLAY DEVICE, MANUFACTURING METHOD OF THE SAME AND ELECTRONIC EQUIPMENT

(71) Applicant: Japan Display Inc., Tokyo (JP)

(72) Inventors: Daisuke Ito, Aichi (JP); Hideyuki Omori, Aichi (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/785,706

(22) Filed: Oct. 17, 2017

(65) Prior Publication Data

US 2018/0039147 A1    Feb. 8, 2018

Related U.S. Application Data

(63) Continuation of application No. 14/887,897, filed on Oct. 20, 2015, now Pat. No. 9,823,533, which is a
(Continued)

(30) Foreign Application Priority Data

Mar. 12, 2012 (JP) ................................. 2012-054439

(51) Int. Cl.
*G02F 1/1362* (2006.01)
*G02F 1/1337* (2006.01)
*G02F 1/1343* (2006.01)

(52) U.S. Cl.
CPC .. *G02F 1/136286* (2013.01); *G02F 1/133707* (2013.01); *G02F 1/133784* (2013.01);
(Continued)

(58) Field of Classification Search
CPC ..................................................... G02F 1/1343
See application file for complete search history.

(56) References Cited

U.S. PATENT DOCUMENTS 7,253,863 B2    8/2007  Ono et al.
9,823,533 B2 * 11/2017  Ito ..................... G02F 1/133784
(Continued)

FOREIGN PATENT DOCUMENTS

CN          101046592 A      10/2007
CN          101978314 A       2/2011
(Continued)

OTHER PUBLICATIONS

Japanese Office Action dated Feb. 24, 2015 for corresponding Japanese Application No. 2012-054439.
(Continued)

*Primary Examiner* — Sang V Nguyen
(74) *Attorney, Agent, or Firm* — Michael Best & Friedrich LLP

(57) ABSTRACT

A liquid crystal display device includes: a plurality of scan lines and signal lines on one of a pair of substrates arranged to be opposed to each other with a liquid crystal layer sandwiched therebetween, the scan lines and signal lines extending in different directions; and an orientation film, pixel electrode, insulating layer and common electrode, the orientation film being rubbed in a rubbing direction having a given inclination with respect to a pixel arrangement direction. The pixel electrode is partitioned by the scan lines and signal lines and has subpixels made up of first and second regions. The first region has a plurality of slit-shaped openings having a given inclination in a first direction with respect to the rubbing direction. The second region has a plurality of slit-shaped openings having a given inclination in a second direction with respect to the rubbing direction.

14 Claims, 13 Drawing Sheets

Related U.S. Application Data continuation of application No. 13/713,214, filed on Dec. 13, 2012, now Pat. No. 9,195,098.

(52) U.S. Cl.
CPC ............... *G02F 1/134363* (2013.01); *G02F 2001/134372* (2013.01); *G02F 2201/52* (2013.01)

(56) References Cited

U.S. PATENT DOCUMENTS

| | | | |
|---|---|---|---|
| 2007/0002247 A1* | 1/2007 | Lee | G02F 1/134363 349/141 |
| 2007/0152939 A1 | 7/2007 | Kim et al. | |
| 2007/0229749 A1* | 10/2007 | Kaneko | G02F 1/133707 349/141 |
| 2009/0051640 A1* | 2/2009 | Tanaka | G02F 1/136286 345/92 |
| 2009/0115712 A1 | 5/2009 | Morimoto et al. | |
| 2010/0039589 A1 | 2/2010 | Shibahara | |
| 2010/0157228 A1* | 6/2010 | Sakurai | G02F 1/1337 349/141 |
| 2010/0157229 A1* | 6/2010 | Sakurai | G02F 1/134363 349/141 |
| 2011/0012821 A1 | 1/2011 | Ogura et al. | |
| 2011/0109862 A1* | 5/2011 | Harada | G02F 1/134363 349/141 |
| 2011/0128486 A1 | 6/2011 | Kim | |
| 2011/0171766 A1 | 7/2011 | Kim et al. | |
| 2011/0187978 A1 | 8/2011 | Kim et al. | |
| 2011/0242149 A1 | 10/2011 | Yoshida et al. | |
| 2012/0050630 A1* | 3/2012 | Sato | G02F 1/134363 349/33 |
| 2012/0099066 A1* | 4/2012 | Ougiichi | G02F 1/133345 349/138 |
| 2012/0127148 A1* | 5/2012 | Lee | G02F 1/134363 345/212 |
| 2012/0229745 A1* | 9/2012 | Harada | G02F 1/133707 349/126 |
| 2014/0232973 A1 | 8/2014 | Sakurai | |

FOREIGN PATENT DOCUMENTS

| | | |
|---|---|---|
| CN | 102246222 A | 11/2011 |
| JP | 2007-264231 A | 10/2007 |
| JP | 2009-237414 A | 10/2009 |
| JP | 2009-288604 * | 12/2009 ........... G02F 1/1343 |
| JP | 2009-288604 A1 | 12/2009 |

OTHER PUBLICATIONS

Taiwanese Office Action dated Feb. 13, 2015 for corresponding Taiwanese Application No. 101142707.

Chinese Office Action dated Aug. 2, 2016 for corresponding Chinese Patent Application No. 201310038451.X.

\* cited by examiner

ORIENTATION DIRECTION

LIQUID CRYSTAL DISPLAY DEVICE, MANUFACTURING METHOD OF THE SAME AND ELECTRONIC EQUIPMENT

RELATED APPLICATIONS

The present application is a Continuation application of Ser. No. 14/887,897, filed on Oct. 20, 2015, which is a Continuation application of Ser. No. 13/713,214, filed on Dec. 13, 2012, now U.S. Pat. No. 9,195,098 issued on Nov. 24, 2015, which claims the benefit of Japanese Priority Patent JP 2012-054439 filed in the Japan Patent Office on Mar. 12, 2012, the entire content of which is hereby incorporated by reference.

BACKGROUND

The present technology relates to a liquid crystal display device, manufacturing method of the same and electronic equipment having the same.

An FFS (Fringe Field Switching) LCD (Liquid Crystal Display) panel is known as a horizontal field LCD panel. An FFS LCD panel has found application in portable electronic equipment such as mobile phones thanks to widespread use of such electronic equipment. Portable electronic equipment is often used outdoors, and a user of such equipment has opportunities to view a display screen of the portable electronic equipment through polarized sunglasses. At this time, if the FFS LCD panel has a linear polarization characteristic, and if a transmission axis of the polarized sunglasses and that of the FFS LCD panel are 0 and 180 degrees or 90 and 270 degrees, the user (viewer) may find it difficult to view the display screen.

As a measure intended for polarized sunglasses, a phase difference plate may be provided to change linear polarization into circular polarization. However, this leads to a larger module thickness and higher cost.

For this reason, an LCD panel has been proposed in which a rubbing direction is set to be other than a direction parallel or orthogonal to a pixel arrangement direction, and in which a transmission axis of a polarizing element is oriented in the same direction as the rubbing direction. Such an LCD panel can contribute to reduced decline in brightness for the viewer wearing polarized sunglasses without providing a phase difference plate.

For more information, the reader is suggested to refer to documents such as Japanese Patent Laid-Open No. 2009-288604.

SUMMARY

However, it is difficult to lay out slit-shaped openings in a pixel electrode with high efficiency by simply setting the rubbing direction to be other than the direction parallel or orthogonal to the pixel arrangement direction and having the transmission axis of the polarizing element oriented in the same direction as the rubbing direction, thus resulting in a large loss in aperture ratio.

In light of the foregoing, it is desirable to provide a liquid crystal display device, manufacturing method of the same and electronic equipment having the same that contribute to reduced loss in aperture ratio while at the same time taking a measure intended for polarized sunglasses.

According to an embodiment of the present technology, there is provided a liquid crystal display device including: a plurality of scan lines and a plurality of signal lines on one of a pair of substrates arranged to be opposed to each other with a liquid crystal layer sandwiched therebetween, the plurality of scan lines and the plurality of signal lines extending in different directions; and an orientation film, pixel electrode, insulating layer and common electrode in this order from the side of the liquid crystal layer, the orientation film being rubbed in a rubbing direction having a given inclination with respect to a pixel arrangement direction. The pixel electrode is partitioned by the scan lines and signal lines and has subpixels made up of first and second regions arranged side by side in the rubbing direction. The first region has a plurality of slit-shaped openings having a given inclination in a first direction with respect to the rubbing direction. The second region has a plurality of slit-shaped openings having a given inclination in a second direction with respect to the rubbing direction.

According to another embodiment of the present technology, there is provided a manufacturing method of a liquid crystal display device, the liquid crystal display device including: a plurality of scan lines and a plurality of signal lines on one of a pair of substrates arranged to be opposed to each other with a liquid crystal layer sandwiched therebetween, the plurality of scan lines and the plurality of signal lines extending in different directions; and an orientation film, pixel electrode, insulating layer and common electrode in this order from the side of the liquid crystal layer. The manufacturing method including: rubbing the orientation film in a rubbing direction having a given inclination with respect to a pixel arrangement direction; and forming the pixel electrode partitioned by the scan lines and signal lines and having subpixels made up of first and second regions that are arranged side by side in the rubbing direction. The first region has a plurality of slit-shaped openings having a given inclination in a first direction with respect to the rubbing direction, and the second region has a plurality of slit-shaped openings having a given inclination in a second direction with respect to the rubbing direction.

According to still another embodiment of the present technology, there is provided electronic equipment having the above-described liquid crystal display device.

The liquid crystal display device, manufacturing method of the same and electronic equipment having the same contribute to reduced loss in aperture ratio while at the same time taking a measure for polarized sunglasses.

BRIEF DESCRIPTION OF THE DRAWINGS

FIG. 10A is a perspective view of appearance of the front side of the digital camera, and FIG. 10B a perspective view of appearance of the rear side thereof;

FIG. 13A is a front view of the mobile phone in an open position, FIG. 13B a side view thereof, FIG. 13C a front view thereof in a closed position, FIG. 13D a left side view thereof, FIG. 13E a right side view thereof, FIG. 13F a top side view thereof, and FIG. 13G a bottom side view thereof.

DETAILED DESCRIPTION OF THE PREFERRED EMBODIMENTS

A description will be given below of preferred embodiments of the present technology with reference to the accompanying drawings.

First Embodiment

Figure 1:
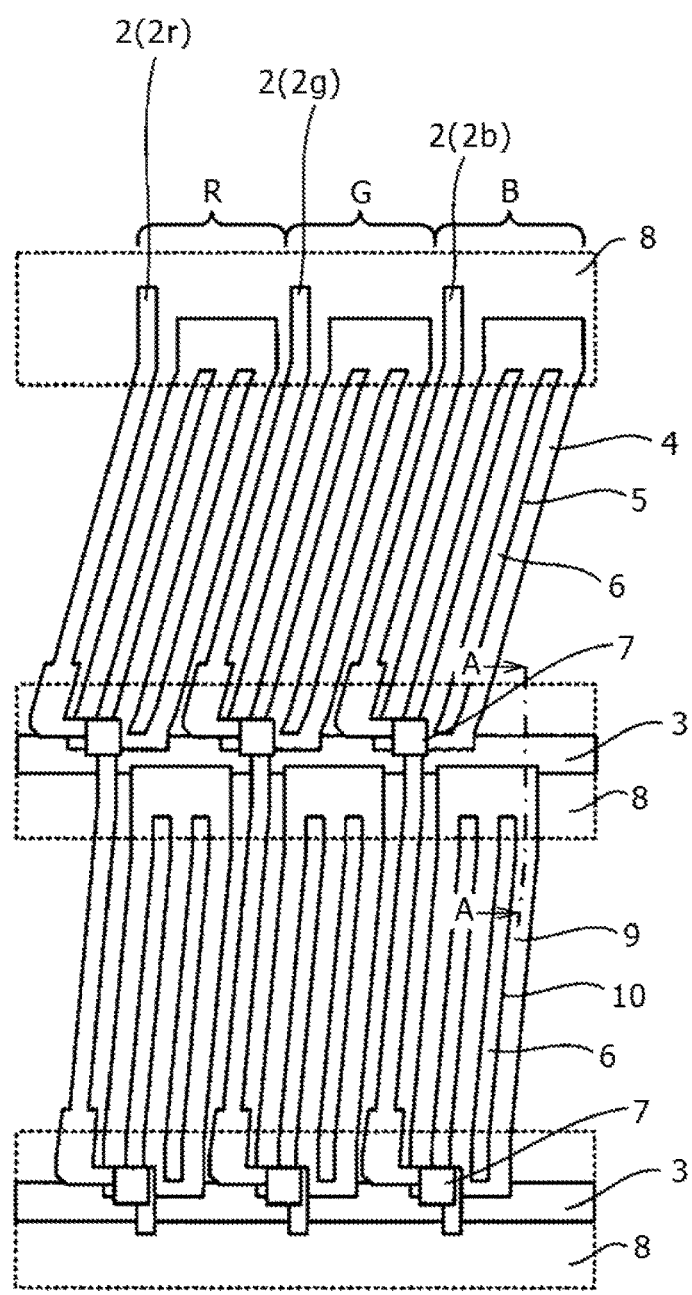
FIG. 1 is a diagram illustrating a front view of a pixel of a liquid crystal display panel according to a first embodiment.
Figure 2:
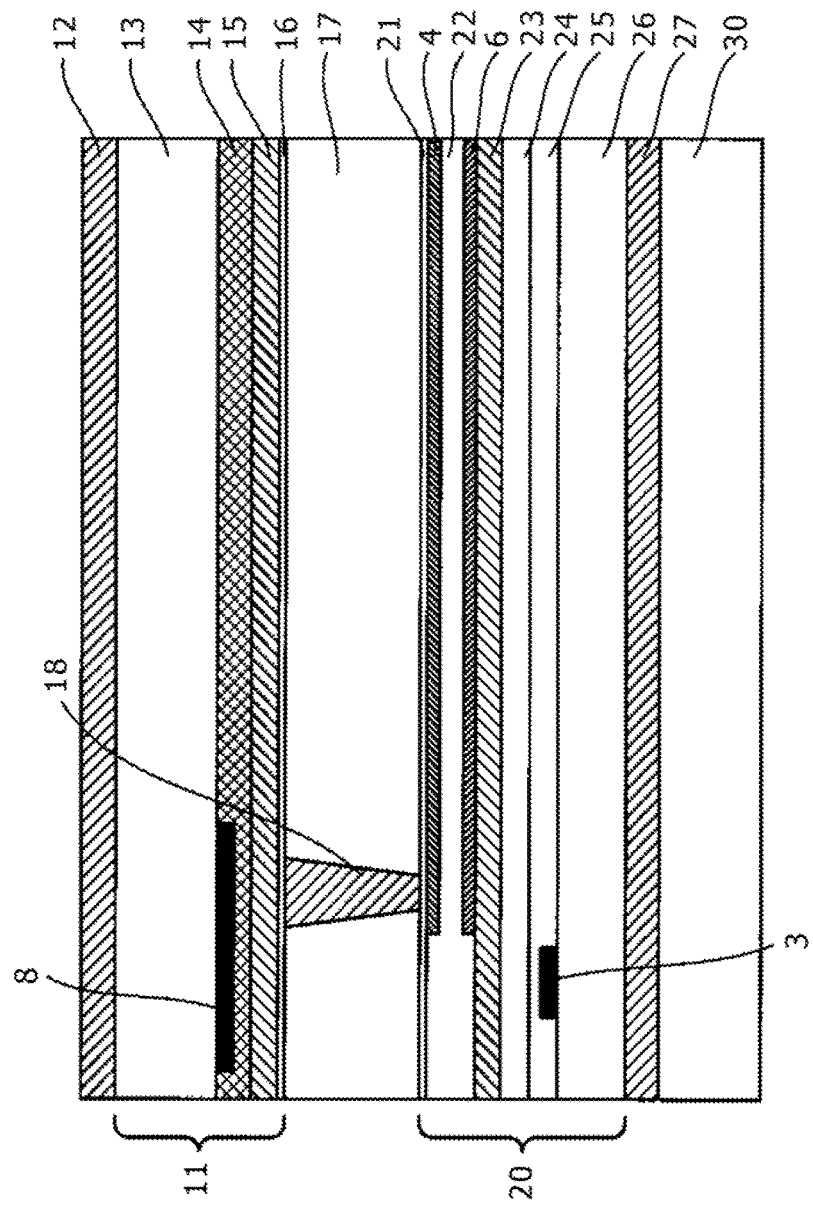
FIG. 2 is a cross-sectional view along line A-A in FIG. 1.
Figure 3:
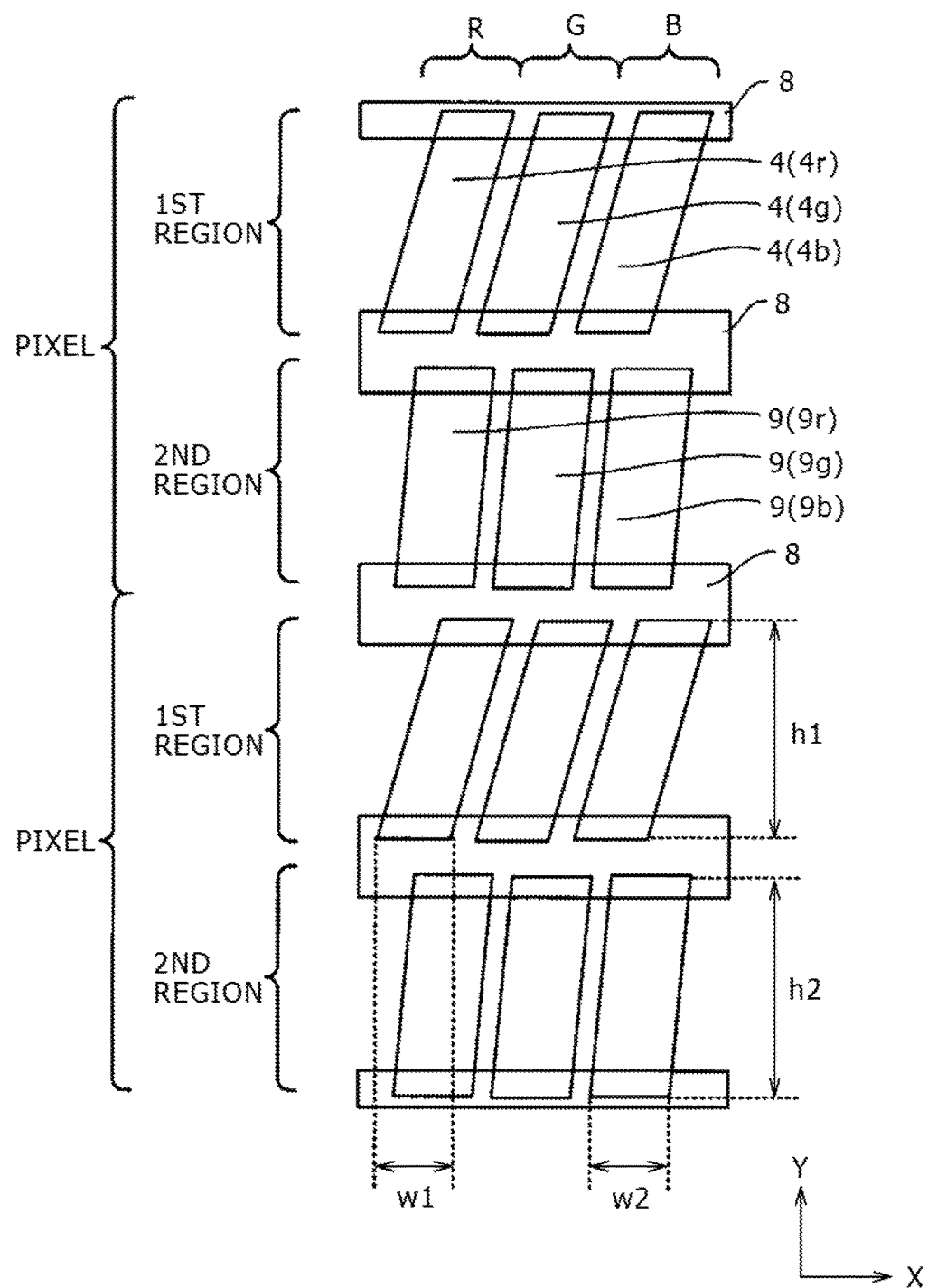
FIG. 3 is a diagram illustrating an interleaved structure of regions making up subpixels of the liquid crystal display panel according to the first embodiment.

A description will be given first of a liquid crystal display panel according to a first embodiment with reference to FIGS. 1 to 3. FIG. 1 is a diagram illustrating a front view of a pixel of the liquid crystal display panel according to the first embodiment. FIG. 2 is a cross-sectional view along line A-A in FIG. 1. FIG. 3 is a diagram illustrating an interleaved structure of regions making up subpixels of the liquid crystal display panel according to the first embodiment.

A liquid crystal display panel (liquid crystal display device) 1 is a horizontal field liquid crystal display panel, and more specifically, an FFS liquid crystal display panel. The same panel 1 includes a color filter substrate 11 and array substrate 20 as a pair of substrates arranged to be opposed to each other. Each of the color filter substrate 11 and array substrate 20 is made of a transparent member such as glass or plastic as a base material. These substrates 11 and 20 sandwich a liquid crystal layer 17. The gap between the same substrates 11 and 20 is maintained constant in thickness by a spacer 18.

The liquid crystal display panel 1 includes first and second polarizing plates 27 and 12 respectively on outer surfaces of the array substrate 20 and color filter substrate 11 that are arranged to be opposed to each other. The first polarizing plate 27 is provided on a surface on the side of a light source (backlight 30) of the array substrate 20. The second polarizing plate 12 is provided on a surface on the viewing side of the color filter substrate 11.

The array substrate 20 includes a substrate main body 26 as a base. The substrate main body 26 includes a transparent member made of glass, quartz, plastic or other material as a base material. The array substrate 20 includes scan lines 3 and a gate insulating film 25 covering the scan lines 3 on the side of the substrate main body 26 facing the liquid crystal layer 17. The array substrate 20 includes TFTs (Thin Film Transistors) 7 on the gate insulating film 25. Each of the TFTs 7 includes a semiconductor layer (e.g., amorphous silicon), source electrode and drain electrode. It should be noted that semiconductor layers of the TFTs 7 are arranged to be opposed to the scan lines 3 via the gate insulating film 25.

The array substrate 20 includes an interlayer insulating film 24 on the gate insulating film 25 in such a manner as to cover the TFTs 7. The same film 24 is made, for example, of silicon oxide or silicon nitride. The array substrate 20 includes a resin layer 23 on the interlayer insulating film 24, and further common electrodes (lower electrodes) 6 on the resin layer 23, one for each region partitioned by the scan lines 3 and signal lines 2 (2r, 2g and 2b). The common electrodes 6 are made, for example, of a transparent conductive material such as ITO (Indium Tin Oxide) or IZO (Indium Zinc Oxide). The array substrate 20 includes an interelectrode insulating film 22 in such a manner as to cover the common electrodes 6. The same film 22 is made, for example, of silicon oxide or silicon nitride produced at low temperatures.

The array substrate 20 includes pixel electrodes (upper electrodes) 4 on the side of the interelectrode insulating film 22 facing the liquid crystal layer. The pixel electrodes 4 are made, for example, of a transparent conductive material such as ITO or IZO. Each of the pixel electrodes 4 has a plurality of slit-shaped openings 5 extending approximately in a y-axis direction. The slit-shaped openings 5 are formed by exposing and etching the pixel electrodes 4 by photolithography.

The array substrate 20 includes a first orientation film 21 in such a manner as to cover the pixel electrodes 4 and interelectrode insulating film 22. The first orientation film 21 is made, for example, of polyimide. The same film 21 has been rubbed in a given direction (e.g., direction inclined ten degrees clockwise with respect to the y axis).

The color filter substrate 11 includes a substrate main body 13 as a base. The substrate main body 13 includes a transparent member made of glass, quartz, plastic or other material as a base material. The substrate main body 13 includes a color filter layer 14 adapted to pass light of a different color (e.g., red (R), green (G) or blue (B)) for each subpixel and a black matrix 8 made of a light-shielding material at a necessary location. The color filter substrate 11 includes a protective resin layer 15 in such a manner as to cover the color filter layer 14 and black matrix 8 and also includes a second orientation film 16 in such a manner as to cover the protective resin layer 15. The same film 16 has been rubbed in a given direction (e.g., direction inclined ten degrees clockwise with respect to the y axis).

A transmission axis of the second polarizing plate 12 is parallel to the rubbing direction of the second orientation film 16. A transmission axis of the first polarizing plate 27 is orthogonal to that of the second polarizing plate 12. The second orientation film 16 is rubbed in a direction intersecting a principal direction of an electric field generated between the pixel electrode 4 and common electrode 6. When an electric voltage is applied between the pixel electrode 4 and common electrode 6, liquid crystal molecules oriented parallel to the rubbing direction in an initial orientation condition rotate and become oriented in the principal direction of the electric field. The liquid crystal display panel 1 displays a gray level of each subpixel based on the difference between the initial orientation condition and the orientation condition at the time of application of an electric voltage.

In the liquid crystal display panel 1 configured as described above, a transmission axis of polarized sunglasses and that of the second polarizing plate 12 are not in a 0- and 180-degree relationship or a 90- and 270-degree relationship. This contributes to reduced decline in brightness for a viewer wearing polarized sunglasses without providing a phase difference plate.

A description will be given next of a pixel configuration of the liquid crystal display panel 1. The same panel 1 includes a plurality of pixels arranged in an x-axis direction and the y-axis direction orthogonal to the x-axis direction in a matrix form. Each of the pixels of the liquid crystal display panel 1 is approximately rectangular with an aspect ratio of 1:1. Each of the pixels of the same panel 1 includes three subpixels, each of which corresponds to one of red, green and blue. Therefore, each of the subpixels is approximately rectangular with an aspect ratio of 3:1. Each of the subpixels includes a first region for the pixel electrode 4 and a second region for a pixel electrode 9. It should be noted that each of the pixel electrodes 4 and 9 is connected to the TFT 7 independently from the other TFTs 7, thus allowing the first and second regions to display gray levels independently of each other.

That is, each pixel includes pixel electrodes 4r and 9r for red (R), pixel electrodes 4g and 9g for green (G) and 4b and 9b for blue (B). The first regions for RGB (pixel electrodes 4r, 4g and 4b) are arranged side by side in the x-axis direction. Similarly, the second regions for RGB (pixel electrodes 9r, 9g and 9b) are arranged side by side in the x-axis direction.

Each of the pairs of the first and second regions making up a subpixel (pixel electrodes 4r and 9r, 4g and 9g or 4b and 9b) is arranged roughly along the rubbing direction from a local viewpoint, i.e., within a pixel. It should be noted that the first and second regions are arranged side by side in a pixel arrangement direction (y-axis direction) from a broad viewpoint overlooking the plurality of pixels. That is, the first and second regions are arranged alternately and repeatedly.

The first and second regions are partitioned by the signal lines 2 and scan lines 3. The signal lines 2 run along one side of the pixel electrodes 4 and 9 in the direction of extension and are routed in a crank form at both ends of the pixel electrodes 4 and 9 in the direction of extension so as to put interconnects displaced in the x-axis direction back into place (connect the interconnects). That is, the signal lines 2 are routed in a sawtooth pattern. The scan lines 3 are routed linearly in the x-axis direction.

Each of the first regions partitioned as described above is in the form of a parallelogram having a height (y-axis direction) h1 and a width (x-axis direction) w1. Each of the second regions is in the form of a parallelogram having a height (y-axis direction) h2 and a width (x-axis direction) w2.

Therefore, if the heights h1 and h2 are the same, and the widths w1 and w2 the same, the liquid crystal display panel 1 can readily provide the same aperture ratio for the first and second regions. Even if the first and second regions are arranged side by side alternately, the liquid crystal display panel 1 having the same aperture ratio for the first and second regions provides reduced likelihood of the viewer viewing streaks (lines caused by contrast in the x-axis direction).

A description will be given next of a slit-shaped opening 5 of the pixel electrode 4 and a slit-shaped opening 10 of the pixel electrode 9. An electric field is generated by a potential difference between the pixel electrodes 4 and 9 and the common electrodes 6 located at the slit-shaped openings 5 and 10. The electric field is generated approximately parallel to a surface of the array substrate 20 and is, as seen in planar view, oriented in a direction of a normal to sides of the slit-shaped openings 5 and 10.

Electric fields generated along short sides of the slit-shaped openings 5 and 10 at both ends differ in direction from those generated along long sides, that is, along the direction of extension of the same openings 5 and 10, thus resulting in reverse twisted domains. It is difficult to display an image properly where such reverse twisted domains occur, thus leading to a reduced aperture ratio. It is necessary for both ends of the slit-shaped openings 5 and 10 and their proximities to have a space for closing the slit-shaped openings 5 and 10, thus resulting in even lower aperture ratio.

The slit-shaped openings 5 and 10 are arranged with their long sides oriented respectively in the directions of extension of the pixel electrodes 4 and 9. Both ends of the same openings 5 and 10 are located respectively near the short sides of the pixel electrodes 4 and 9. This permits efficient arrangement of the slit-shaped openings 5 and 10 respectively in the pixel electrodes 4 and 9 in the liquid crystal display panel 1.

The liquid crystal display panel 1 keeps the number of ends of the slit-shaped openings 5 and 10, areas disadvantageous for improving the aperture ratio, to a minimum by aligning the directions of extension of the same openings 5 and 10 with those of the pixel electrodes 4 and 9. In the liquid crystal display panel 1, each of black matrices 8 overlaps with one of the scan lines 3 and the ends of the pixel electrodes 4 and 9 as seen in planar view. This ensures overlapping of the ends of the slit-shaped openings 5 and 10, the areas disadvantageous for improving the aperture ratio, with the black matrices 8 that do not inherently contribute to the openings, thus eliminating the disadvantage for improving the aperture ratio.

It should be noted that if the number of ends of the slit-shaped openings increases due to splitting of the slit-shaped openings in domains oriented in different directions, bending portions may be provided in the slit-shaped openings to form the domains oriented in different directions. Such bending portions may cause ripples because of the passage of the domains oriented in different directions. However, the liquid crystal display panel 1 provides improved aperture ratio and minimizes ripples at the same time.

The direction of extension of the slit-shaped openings 5 is inclined at a given angle α (e.g., about five degrees clockwise) with respect to the rubbing direction of the first orientation film 21 (e.g., direction inclined about ten degrees clockwise with respect to the y axis). The direction of extension of the slit-shaped openings 10 is inclined at a given angle (e.g., about five degrees counterclockwise) with respect to the rubbing direction of the first orientation film 21.

This ensures that the liquid crystal molecules rotate in different directions in the first and second regions in the liquid crystal display panel 1. That is, the same panel 1 has a dual-domain structure with the first and second regions, thus providing an enhanced viewing angle. It should be noted that the first and second regions can display gray levels independently of each other. Therefore, the liquid crystal display panel 1 may be considered as having a pseudo-dual-domain structure.

Figure 4:
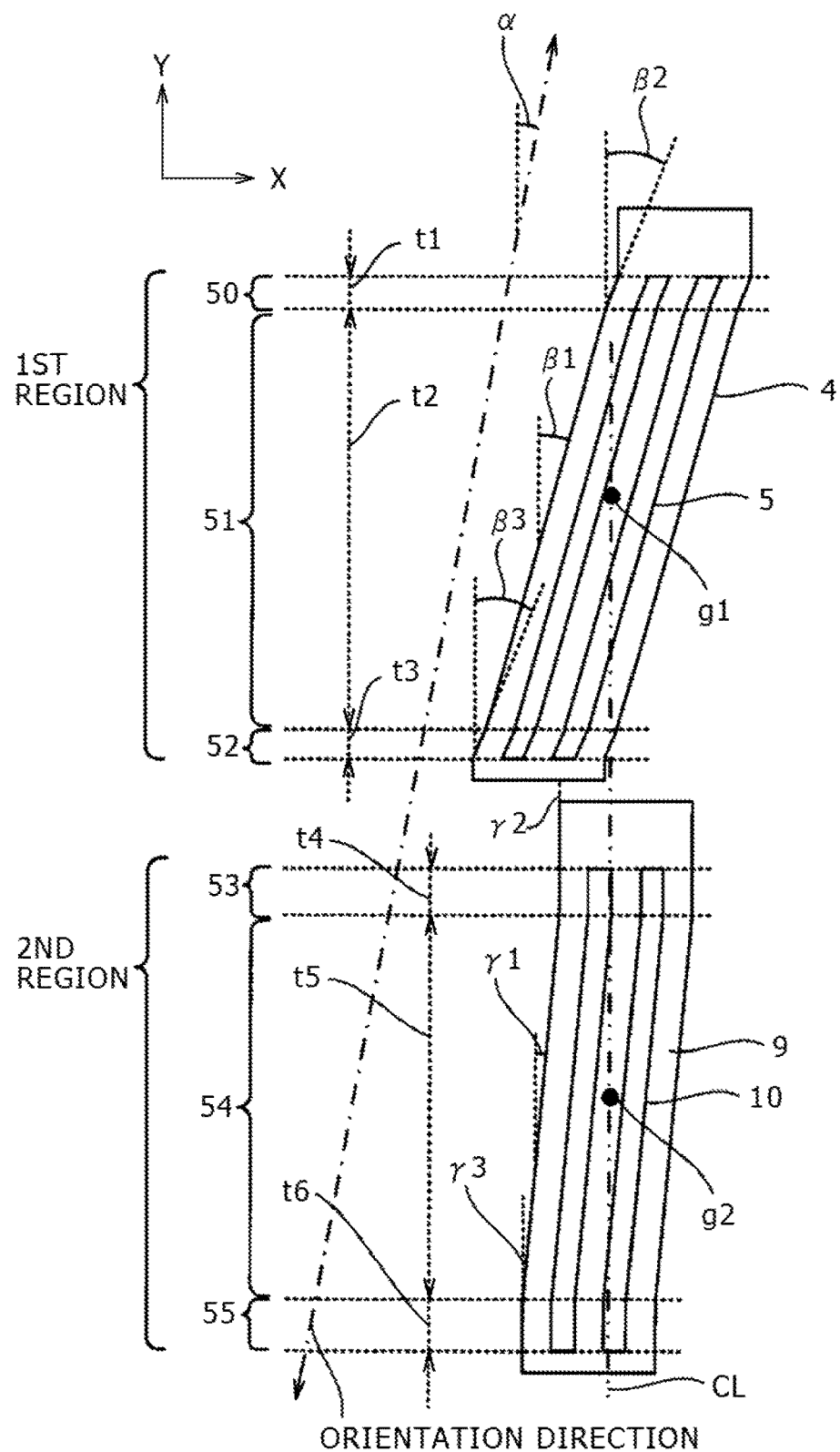
FIG. 4 is a diagram illustrating an example of pixel electrodes and slit-shaped openings of the liquid crystal display panel according to the first embodiment.

A description will be given next of the pixel electrodes according to the first embodiment with reference to FIG. 4. FIG. 4 is a diagram illustrating an example of shape of the pixel electrodes and slit-shaped openings of the liquid crystal display panel according to the first embodiment.

The rubbing direction (orientation direction) of the liquid crystal display panel 1 is inclined α degrees (e.g., about ten degrees) clockwise with respect to the y-axis direction. The direction of extension of the pixel electrode 4 is inclined β1 degrees (e.g., about 15 degrees) clockwise with respect to the y-axis direction. In other words, the direction of extension of the pixel electrode 4 is inclined (|β1−α|) degrees (e.g., about five degrees) clockwise with respect to the rubbing direction. The direction of extension of the pixel electrode 9 is inclined γ1 degrees (e.g., about five degrees) clockwise with respect to the y-axis direction. In other words, the direction of extension of the pixel electrode 9 is inclined (|γ1−α|) degrees (e.g., about five degrees) counterclockwise with respect to the rubbing direction.

As described above, the direction of extension of the pixel electrode 4 and that of the pixel electrode 9 are inclined by the same angle with respect to the rubbing direction while being oriented in different directions (clockwise and counterclockwise). As a result, the subpixels of the liquid crystal display panel 1 have a dual-domain (multi-domain) structure thanks to the first and second regions formed in the same panel 1.

The pixel electrode 4 has the two slit-shaped openings 5 which extend in the same direction as the pixel electrode 4 and both of which are the same shape. The two slit-shaped openings 5 are arranged side by side in the x-axis direction with their y-axis positions aligned. Each of the slit-shaped openings 5 includes a main portion 51 and auxiliary portions 50 and 52. The main portion 51 makes up a main part of the slit-shaped opening extending from the center thereof to areas near both ends in the direction of extension. Each of the auxiliary portions 50 and 52 is located at the end of the slit-shaped opening in the direction of extension.

The main portion 51 has a length t2 as a y-axis component. The auxiliary portion 50 has a length t1 as a y-axis component. The auxiliary portion 52 has a length t3 as a y-axis component. The auxiliary portions 50 and 52 are of approximately the same length (t1≈t3). The main portion 51 is sufficiently longer than the auxiliary portions 50 and 52 (t2>t1 and t2>t3).

The direction of extension of the main portion 51 is inclined β1 degrees (e.g., about 15 degrees) clockwise with respect to the y-axis direction. In other words, the direction of extension of the main portion 51 is inclined (|β1−α|) degrees (e.g., about five degrees) clockwise with respect to the rubbing direction.

The direction of extension of the auxiliary portion 50 is inclined β2 degrees (e.g., about 20 degrees) clockwise with respect to the y-axis direction. In other words, the direction of extension of the auxiliary portion 50 is inclined (|β2−β1|) degrees (e.g., about five degrees) clockwise with respect to the direction of extension of the main portion 51.

The direction of extension of the auxiliary portion 52 is inclined β3 degrees (e.g., about 20 degrees) clockwise with respect to the y-axis direction. In other words, the direction of extension of the auxiliary portion 52 is inclined (|β3−β1|) degrees (e.g., about five degrees) clockwise with respect to the direction of extension of the main portion 51. It should be noted that although the auxiliary portions 50 and 52 are at the same angle (β2=β3) with respect to the direction of extension of the main portion 51, the auxiliary portions 50 and 52 may be at different angles (β2≠β3).

As described above, the main portion 51 and auxiliary portions 50 and 52 formally have a multi-domain relationship. It should be noted, however, that although the main portion 51 contributes to improvement of the aperture ratio, the auxiliary portions 50 and 52 contribute only in a limited manner to improvement of the aperture ratio because the auxiliary portions 50 and 52 are small as compared to the main portion 51 and because part or whole thereof overlaps the black matrix 8. Therefore, the fact that the slit-shaped opening 5 includes the main portion 51 and auxiliary portions 50 and 52 is not intended to provide improved viewing angle.

Because the slit-shaped opening 5 of the liquid crystal display panel 1 includes the main portion 51 and auxiliary portions 50 and 52, the same panel 1 can be quickly restored to normal from "spreading by screen touching" which occurs when the liquid crystal display panel 1 is pressed. It should be noted that the term "spreading by screen touching" refers to a change in on-screen image as a result of a change in a rotation angle of the liquid crystal molecules that occurs when a display surface of the liquid crystal display panel 1 is pressed.

More specifically, even if the disclination between the main portion 51 and auxiliary portions 50 and 52 is large as a result of the liquid crystal display panel 1 being pressed, the bending portions impart a large rotational force to the liquid crystal molecules, thus making it easy for the same panel 1 to be restored to the initial state. The liquid crystal display panel 1 configured as described above contributes significantly to improved display quality of display devices with touch panel capability. Even if touched and pressed, the same panel 1 can display an image properly to the viewer.

The pixel electrode 9 has the two slit-shaped openings 10 which extend in the same direction as the pixel electrode 9 and both of which are the same shape. The two slit-shaped openings 10 are arranged side by side in the x-axis direction with their y-axis positions aligned. Each of the slit-shaped openings 10 includes a main portion 54 and auxiliary portions 53 and 55. The main portion 54 makes up a main part of the slit-shaped opening extending from the center thereof to areas near both ends in the direction of extension. Each of the auxiliary portions 53 and 55 is located at the end of the slit-shaped opening in the direction of extension.

The main portion 54 has a length t5 as a y-axis component. The auxiliary portion 53 has a length t4 as a y-axis component. The auxiliary portion 55 has a length t6 as a y-axis component. The auxiliary portions 53 and 55 are of approximately the same length (t4≈t6). The main portion 54 is sufficiently longer than the auxiliary portions 53 and 55 (t5>t4 and t5>t6).

The direction of extension of the main portion 54 is inclined γ1 degrees (e.g., about five degrees) clockwise with respect to the y-axis direction. In other words, the direction of extension of the main portion 54 is inclined (|γ1−α|) degrees (e.g., about five degrees) counterclockwise with respect to the rubbing direction.

The direction of extension of the auxiliary portion 53 is inclined γ2 degrees (e.g., about zero degrees) clockwise with respect to the y-axis direction. In other words, the direction of extension of the auxiliary portion 53 is inclined (|γ2−γ1|) degrees (e.g., about five degrees) counterclockwise with respect to the direction of extension of the main portion 54.

The direction of extension of the auxiliary portion 55 is inclined γ3 degrees (e.g., about zero degrees) clockwise with respect to the y-axis direction. In other words, the direction of extension of the auxiliary portion 55 is inclined (|γ3−γ1|) degrees (e.g., about five degrees) counterclockwise with respect to the direction of extension of the main portion 54. It should be noted that although the auxiliary portions 53 and 55 are at the same angle (γ2=γ3) with respect to the direction of extension of the main portion 54, the auxiliary portions 53 and 55 may be at different angles (γ2≠γ3).

As described above, the main portion 54 and auxiliary portions 53 and 55 formally have a multi-domain relationship. It should be noted, however, that although the main portion 54 contributes to improvement of the aperture ratio, the auxiliary portions 53 and 55 contribute only in a limited manner to improvement of the aperture ratio because the auxiliary portions 53 and 55 are small as compared to the main portion 54 and because part or whole thereof overlaps the black matrix 8. Therefore, the fact that the slit-shaped opening 10 includes the main portion 54 and auxiliary portions 53 and 55 is not intended to provide improved viewing angle.

Because the slit-shaped opening 10 of the liquid crystal display panel 1 includes the main portion 54 and auxiliary portions 53 and 55, the same panel 1 can be quickly restored to normal from "spreading by screen touching" which occurs when the liquid crystal display panel 1 is pressed.

More specifically, even if the disclination between the main portion 54 and auxiliary portions 53 and 55 is large as a result of the liquid crystal display panel 1 being pressed, the bending portions impart a large rotational force to the liquid crystal molecules, thus making it easy for the same panel 1 to be restored to the initial state. The liquid crystal display panel 1 configured as described above contributes significantly to improved display quality of display devices with touch panel capability. Even if touched and pressed, the same panel 1 can display an image properly to the viewer.

It should be noted that the subpixel has two gravity centers, i.e., a first region gravity center g1 serving as a center of gravity of the first region (center of the opening) and a second region gravity center g2 serving as a center of gravity of the second region (center of the opening) aligned in the y-axis direction, i.e., the pixel arrangement direction. For example, the subpixel has the first and second region gravity centers g1 and g2 aligned along a subpixel center line CL serving as the center of the subpixel in the x-axis direction. This makes it possible for the liquid crystal display panel 1 to display a straight line properly along the y-axis even if the first and second regions differ in shape.

Figure 5:
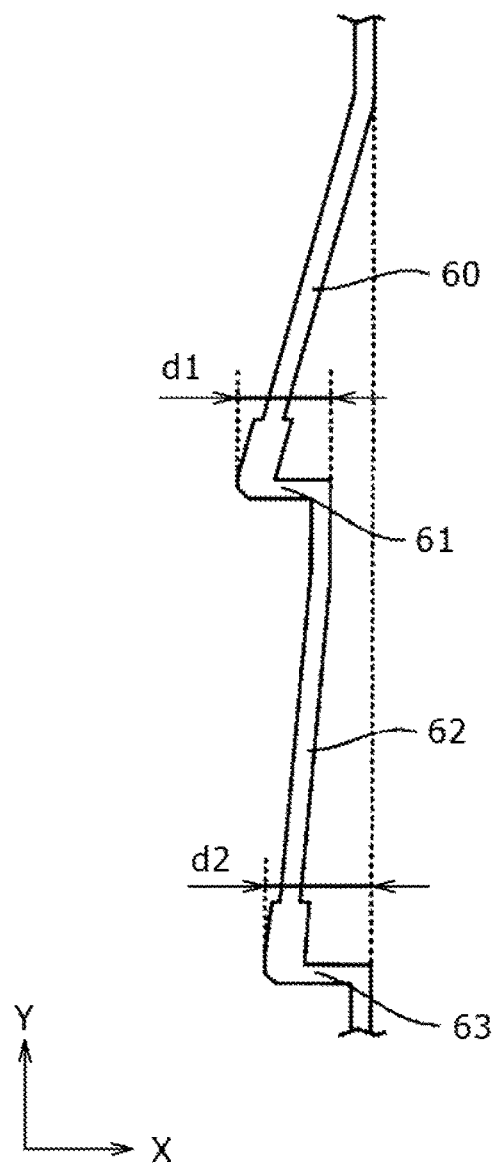
FIG. 5 is a diagram illustrating an example of routing of signal lines of the liquid crystal display panel according to the first embodiment.
Figure 6:
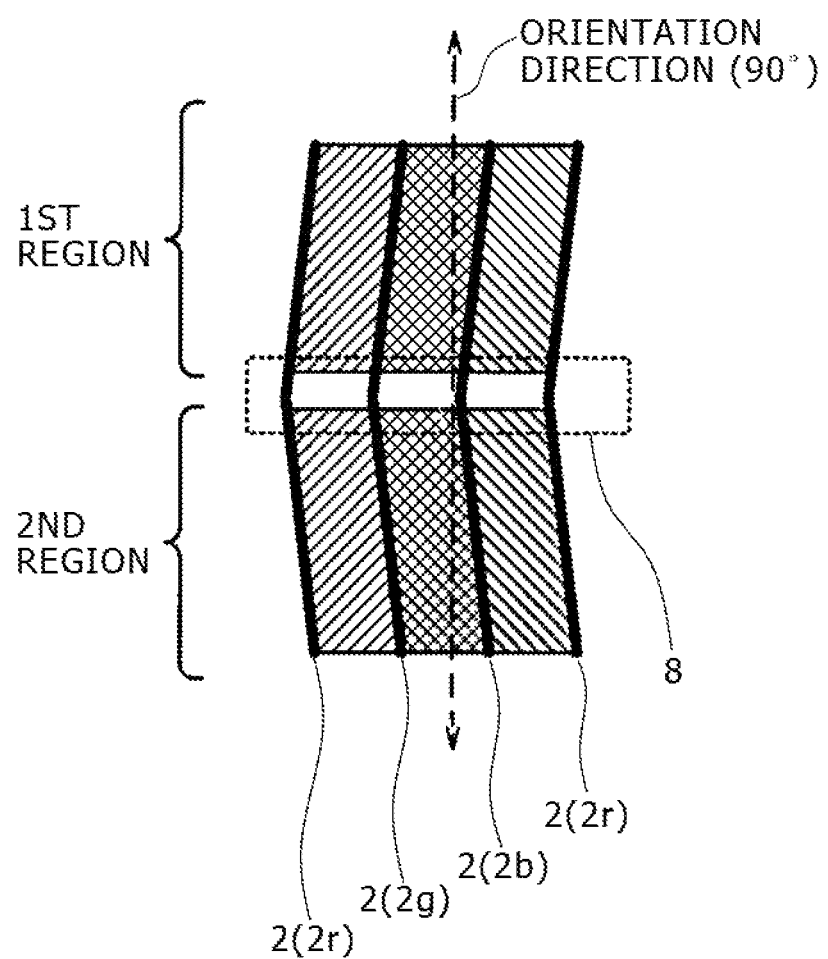
FIG. 6 is a reference diagram illustrating an arrangement of the signal lines adapted to partition the regions making up the subpixels when an orientation direction is 90 degrees.
Figure 7:
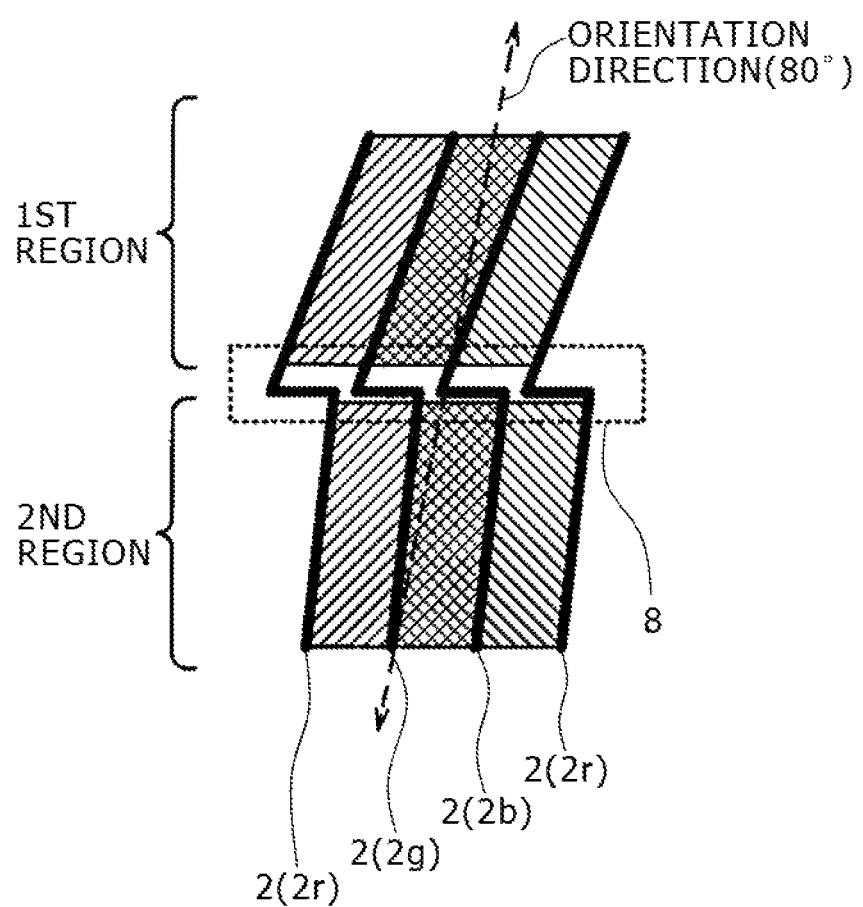
FIG. 7 is a reference diagram illustrating the arrangement of the signal lines adapted to partition the regions making up the subpixels when the orientation direction is 80 degrees.
Figure 8:
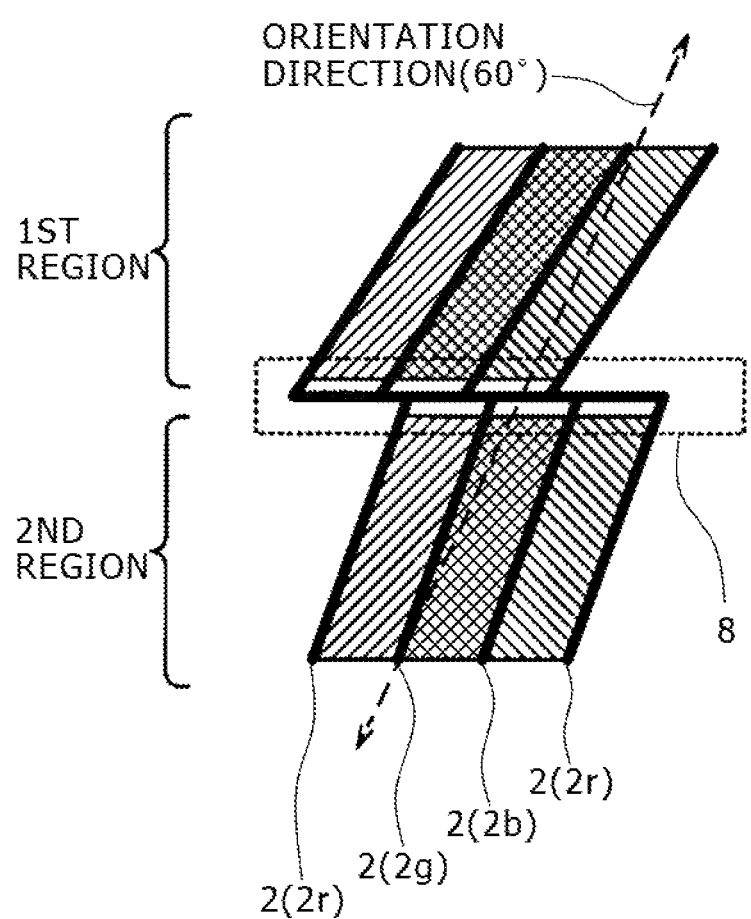
FIG. 8 is a reference diagram illustrating the arrangement of the signal lines adapted to partition the regions making up the subpixels when the orientation direction is 60 degrees.

A description will be given next of routing of the signal lines according to the first embodiment with reference to FIGS. 5 to 8. FIG. 5 is a diagram illustrating an example of routing of the signal lines of the liquid crystal display panel according to the first embodiment. FIG. 6 is a reference diagram illustrating an arrangement of the signal lines adapted to partition the regions making up the subpixels when the orientation direction is 90 degrees. FIG. 7 is a reference diagram illustrating an arrangement of the signal lines adapted to partition the regions making up the subpixels when the orientation direction is 80 degrees. FIG. 8 is a reference diagram illustrating an arrangement of the signal lines adapted to partition the regions making up the subpixels when the orientation direction is 60 degrees.

The signal line 2 shown in FIG. 5 is generally an interconnect segment for one subpixel. The signal line 2 includes extended portions 60 and 62 and pulled-back portions 61 and 63. The signal line 2 repeats itself in the y-axis direction with a unit of repetition made up of the extended portions 60 and 62 and pulled-back portions 61 and 63.

The extended portion 60 is routed along one of the long sides of the first region (left side of the pixel electrode 4 shown in FIG. 1). Therefore, the same portion 60 generally has an inclination at the same angle as the main portion 51 of the slit-shaped opening 5 and extends from the top end to the bottom end of the first region. The extended portion 62 is routed along one of the long sides of the second region (left side of the pixel electrode 9 shown in FIG. 1). Therefore, the same portion 62 generally has an inclination at the same angle as the main portion 54 of the slit-shaped opening 10 and extends from the top end to the bottom end of the second region.

The pulled-back portion 61 is routed in a crank form in such a manner as to connect the extended portions 60 and 62 of the same subpixel. The same portion 61 is routed parallel to the x-axis to eliminate the displacement in the x-axis direction based on the inclination of the extended portion 60 by a length d1. The pulled-back portion 63 is routed in a crank form in such a manner as to connect the extended portions 60 and 62 of two subpixels arranged side by side in the y-axis direction. The same portion 63 is routed parallel to the x-axis to eliminate the displacement in the x-axis direction based on the inclinations of the extended portions 60 and 62 by a length d2.

As described above, the pulled-back portions 61 and 63 eliminate the displacement in the x-axis direction based on the inclinations of the extended portions 60 and 62 within a single unit of repetition of the signal line 2.

A description will be given here of the relationship between the signal line 2 and rubbing direction. The direction of extension of the first region shown in FIGS. 6 to 8 has a clockwise inclination of five degrees with respect to the rubbing direction. The direction of extension of the second region shown in FIGS. 6 to 8 has a counterclockwise inclination of five degrees with respect to the rubbing direction.

It is to be noted that, if a measure intended for polarized sunglasses is not necessary, that is, if the rubbing direction (orientation direction) is inclined 90 degrees with respect to the x-axis, a displacement in the x-axis direction does not occur between the extended portions 60 and 62. Therefore, the pulled-back portions 61 and 63 are not required (FIG. 6).

If a measure intended for polarized sunglasses is necessary, and if, for example, the rubbing direction (orientation direction) is inclined 80 degrees with respect to the x-axis, a displacement in the x-axis direction occurs between the extended portions 60 and 62. Therefore, the signal line 2 has the pulled-back portions 61 and 63 to eliminate this displacement. Although the same portions 61 and 63 do not contribute to any openings of the liquid crystal display panel 1, these portions 61 and 63 are located to overlap the black matrix 8 provided at the boundary between the first and second regions. Because the black matrix 8 is a light-shielding area where no openings are planned to be provided, the pulled-back portions 61 and 63 do not hinder the improvement of the aperture ratio of the liquid crystal display panel 1 (FIG. 7).

If the rubbing direction (orientation direction) is significantly inclined with respect to the x-axis (e.g., 60 degrees), the signal lines 2 between the subpixels interfere with (short out) each other at the pulled-back portions 61 and 63. The signal lines 2r and 2g, signal lines 2g and 2b, and signal lines 2b and 2r shown in FIG. 8 interfere with each other at the pulled-back portion 61. Such routing is not allowed. Therefore, the magnitude of inclination of the rubbing direction (orientation direction) with respect to the x-axis is restricted by the routing of the signal lines 2.

The rubbing direction or the range of inclination of the slit-shaped openings 5 and 10 adjusted based on the rubbing direction can be set to that which is approximated by arctan (H/V) based on the horizontal-to-vertical size ratio (aspect ratio) of the subpixel.

It should be noted that the length d1 of the pulled-back portion 61 and the length d2 of the pulled-back portion 63 can be set to desired values according to the rubbing direction and the inclinations of the slit-shaped openings 5 and 10. The aperture ratio for the first and second regions and the gravity centers for the openings of these regions can be set by setting the length d1 of the pulled-back portion 61 and the length d2 of the pulled-back portion 63.

It should be noted that the liquid crystal display panel 1 can be manufactured, for example, by rubbing and by forming the pixel electrodes. The rubbing is performed on the orientation films (first and second orientation films 21 and 16) in a rubbing direction having a given inclination with respect to the pixel arrangement direction. The pixel electrode formation is performed to form the pixel electrodes 4 and 9 partitioned by the signal line 2 and scan line 3.

Module and Application Examples

A description will be given next of examples of application of the liquid crystal display panel (device) 1 described in the first embodiment to electronic equipment with reference to FIGS. 9 to 14. The liquid crystal display panel 1 according to the first embodiment is applicable to electronic equipment across all disciplines adapted to display a video signal externally fed thereto or generated therein as an image or picture. Among examples of electronic equipment are a television set, digital camera, laptop personal computer, video camcorder, and personal digital assistance such as mobile phone and smartphone.

Second Embodiment

Figure 9:
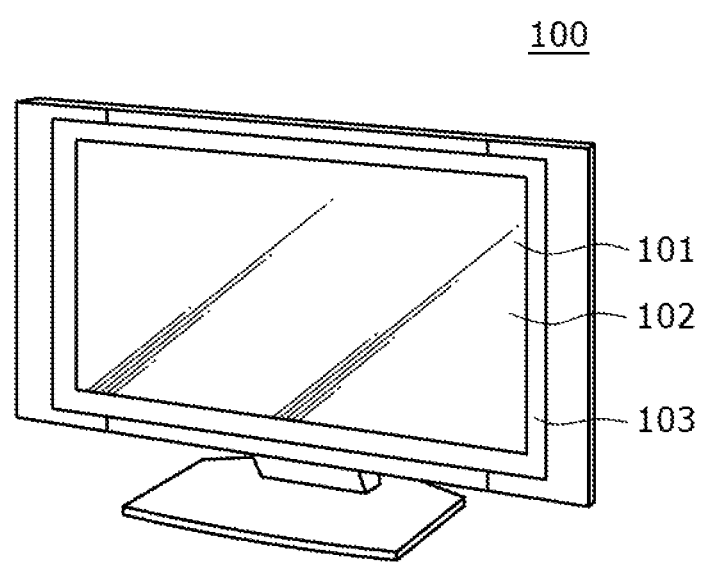
FIG. 9 is a perspective view of appearance illustrating an example of a television set according to a second embodiment.

FIG. 9 is a perspective view of appearance illustrating an example of a television set according to a second embodiment. A television set 100 has, for example, a video display screen section 102 including a front panel 103 and filter glass 101. The video display screen section 102 includes the liquid crystal display panel 1 according to the first embodiment.

Third Embodiment

Figure 10A:
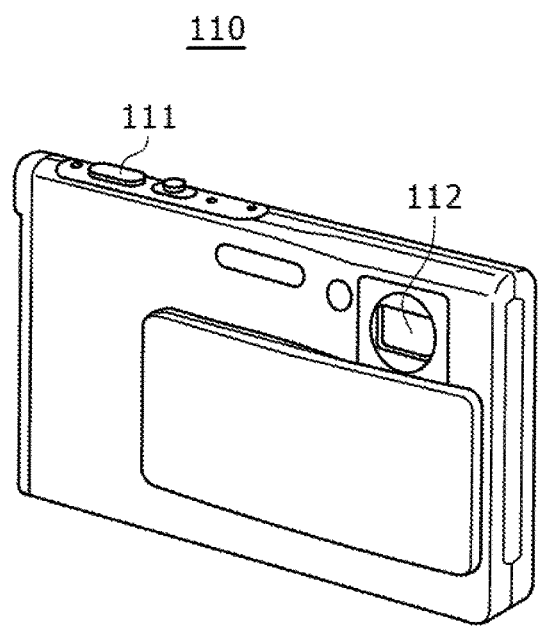
FIGS. 10A and 10B are diagrams illustrating an example of a digital camera according to a third embodiment.
Figure 10B:
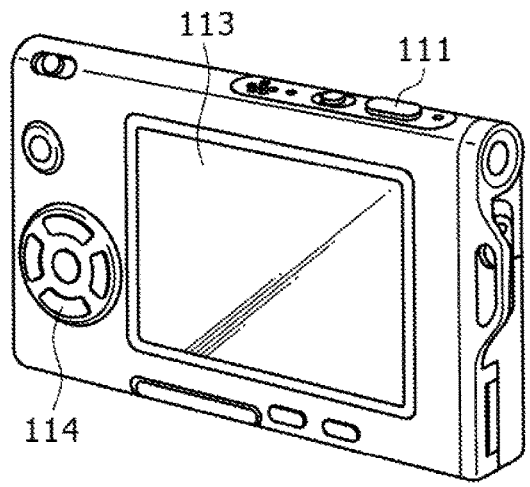

FIGS. 10A and 10B are perspective views of appearance illustrating an example of a digital camera according to a third embodiment. FIG. 10A is a perspective view of appearance as seen from the front of the digital camera, and FIG. 10B a perspective view of appearance as seen from the rear thereof. A digital camera 110 has, for example, a flash-emitting section 112, display section 113, menu switch 114 and shutter button 111. The display section 113 includes the liquid crystal display panel 1 according to the first embodiment.

Fourth Embodiment

Figure 11:
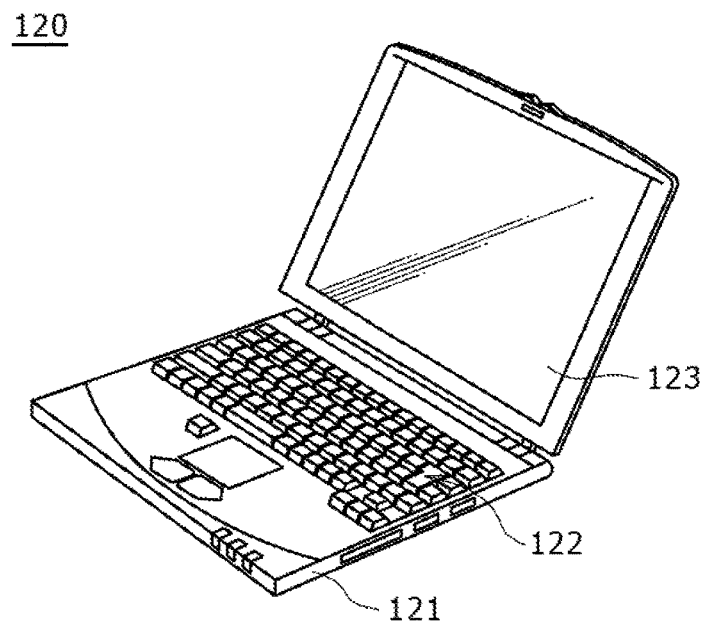
FIG. 11 is a perspective view of appearance illustrating an example of a laptop personal computer according to a fourth embodiment.

FIG. 11 is a perspective view of appearance illustrating an example of a laptop personal computer according to a fourth embodiment. A laptop personal computer 120 has, for example, a main body 121, keyboard 122 adapted to be manipulated for entry of text or other information and a display section 123 adapted to display an image. The display section 123 includes the liquid crystal display panel 1 according to the first embodiment.

Fifth Embodiment

Figure 12:
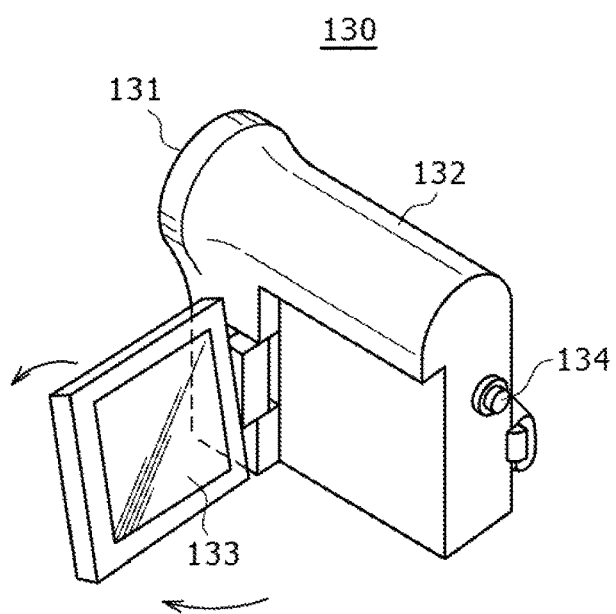
FIG. 12 is a perspective view of appearance illustrating an example of a video camcorder according to a fifth embodiment.
Figure 13:
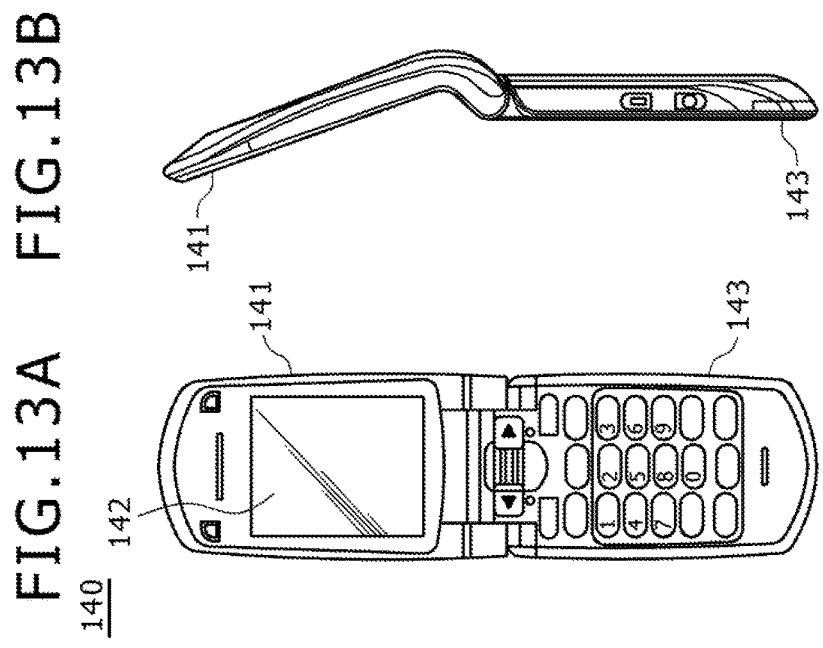
FIGS. 13A to 13G are diagrams illustrating an example of a mobile phone according to a sixth embodiment.

FIG. 12 is a perspective view of appearance illustrating an example of a video camcorder according to a fifth embodiment. A video camcorder 130 has, for example, a main body section 132, lens 131 provided on a front-facing side surface of the main body section 132 to capture an image of a subject, imaging start/stop switch 134 and display section 133. The display section 133 includes the liquid crystal display panel 1 according to the first embodiment.

Sixth Embodiment

FIGS. 13A to 13G are diagrams illustrating an example of a mobile phone according to a sixth embodiment. FIG. 13A is a front view of the mobile phone in an open position, FIG. 13B a side view thereof, FIG. 13C a front view thereof in a closed position, FIG. 13D a left side view thereof, FIG. 13E a right side view thereof, FIG. 13F a top side view thereof, and FIG. 13G a bottom side view thereof. A mobile phone 140 is made up, for example, of an upper enclosure 141 and lower enclosure 143 that are connected together with a connecting section (hinge section) 144. The mobile phone 140 has a display 142, subdisplay 145, picture light 147 and camera 146. Each of the display 142 and subdisplay 145 includes the liquid crystal display panel 1 according to the first embodiment.

Seventh Embodiment

Figure 14:
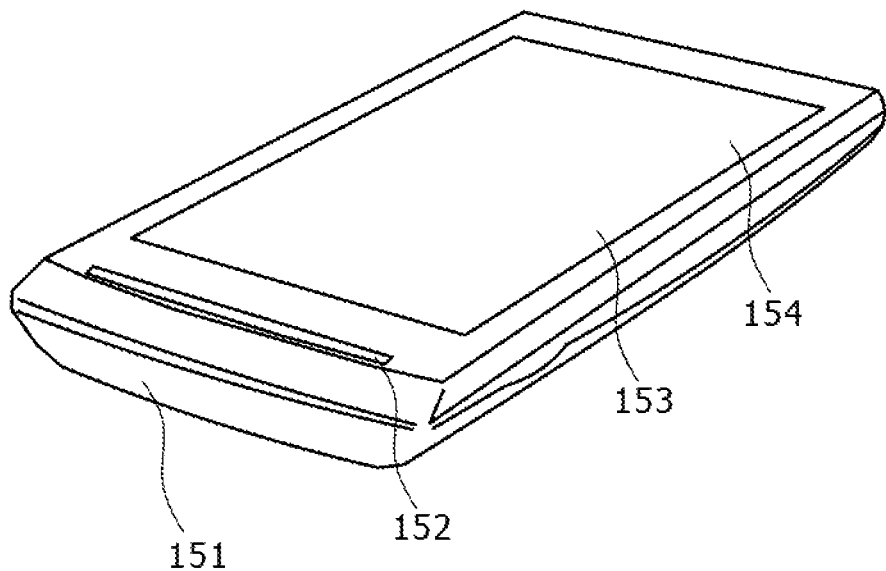
FIG. 14 is a perspective view of appearance illustrating an example of a smartphone according to a seventh embodiment.

FIG. 14 is a perspective view of appearance illustrating an example of a smartphone according to a seventh embodiment. A smartphone 150 has, for example, a main body 151, operation section 152, display section 153 and operation section 154. The operation section 154 is provided on a display screen of the display section 153 to accept touch input onto the display screen. The display section 153 includes the liquid crystal display panel 1 according to the first embodiment. The same section 153 can be quickly restored to normal display from "spreading by screen touching" resulting from touch input onto the operation section 154.

It should be noted that although the operation section 154 is shown on the display screen of the display section 153, a touch operation section may be provided as any of the video display screen section 102, display sections 113, 123 and 133, display 142 and subdisplay 145 shown in the second to sixth embodiments.

It should be noted that the present technology may have following configurations.

(1) A liquid crystal display device including:

a plurality of scan lines and a plurality of signal lines on one of a pair of substrates arranged to be opposed to each other with a liquid crystal layer sandwiched therebetween, the plurality of scan lines and the plurality of signal lines extending in different directions; and an orientation film, pixel electrode, insulating layer and common electrode in this order from the side of the liquid crystal layer, the orientation film being rubbed in a rubbing direction having a given inclination with respect to a pixel arrangement direction, in which the pixel electrode is partitioned by the scan lines and signal lines and has subpixels made up of first and second regions arranged side by side in the rubbing direction, the first region has a plurality of slit-shaped openings having a given inclination in a first direction with respect to the rubbing direction, and the second region has a plurality of slit-shaped openings having a given inclination in a second direction with respect to the rubbing direction.

(2) The liquid crystal display device of feature 1, in which each of the first and second regions has a single-domain structure, and each of the subpixels forms a multi-domain structure with the first and second regions.

(3) The liquid crystal display device of feature 1 or 2, in which the magnitude of inclination of the slit-shaped openings of the first region with respect to the rubbing direction is the same as the magnitude of inclination of the slit-shaped openings of the second region with respect to the rubbing direction.

(4) The liquid crystal display device of feature 3, in which the magnitude of inclination with respect to the rubbing direction is five degrees.

(5) The liquid crystal display device of feature 4, in which the inclination of the rubbing direction is ten degrees.

(6) The liquid crystal display device of feature 5, in which one pixel includes three subpixels.

(7) The liquid crystal display device of any one of features 1 to 6, in which ends of the slit-shaped openings of the first region in the direction of extension further have a given inclination in the first direction, and ends of the slit-shaped openings of the second region in the direction of extension further have a given inclination in the second direction.

(8) The liquid crystal display device of feature 7, in which the ends of the slit-shaped openings of the first and second regions in the direction of extension overlap a black matrix as seen in planar view.

(9) The liquid crystal display device of any one of features 1 to 8, in which each of the signal lines includes a first portion routed along one side of the first region, a second portion routed along one side of the second region, and a third portion adapted to connect, in a crank form, the first and second portions.

(10) The liquid crystal display device of feature 9, in which the signal line includes a fourth portion adapted to connect, in a crank form, the second portion of one pixel and the first portion of another pixel adjacent to the one pixel.

(11) The liquid crystal display device of any one of features 1 to 10, in which an aperture ratio of the first region is the same as that of the second region.

(12) The liquid crystal display device of any one of features 1 to 11, in which a gravity center of the first region is aligned with that of the second region along the pixel arrangement direction.

(13) The liquid crystal display device of any one of features 1 to 12, in which the first and second regions are arranged repeatedly along the pixel arrangement direction in which the first and second regions are arranged side by side.

(14) A manufacturing method of a liquid crystal display device, the liquid crystal display device including a plurality of scan lines and a plurality of signal lines on one of a pair of substrates arranged to be opposed to each other with a liquid crystal layer sandwiched therebetween, the plurality of scan lines and the plurality of signal lines extending in different directions, and an orientation film, pixel electrode, insulating layer and common electrode in this order from the side of the liquid crystal layer, the manufacturing method including:

rubbing the orientation film in a rubbing direction having a given inclination with respect to a pixel arrangement direction; and forming the pixel electrode partitioned by the scan lines and signal lines and having subpixels made up of first and second regions that are arranged side by side in the rubbing direction, the first region having a plurality of slit-shaped openings having a given inclination in a first direction with respect to the rubbing direction, and the second region having a plurality of slit-shaped openings having a given inclination in a second direction with respect to the rubbing direction.

(15) Electronic equipment having a liquid crystal display device, the liquid crystal display device including:

a plurality of scan lines and a plurality of signal lines on one of a pair of substrates arranged to be opposed to each other with a liquid crystal layer sandwiched therebetween, the plurality of scan lines and the plurality of signal lines extending in different directions; and an orientation film, pixel electrode, insulating layer and common electrode in this order from the side of the liquid crystal layer, the orientation film being rubbed in a rubbing direction having a given inclination with respect to a pixel arrangement direction, in which the pixel electrode is partitioned by the scan lines and signal lines and has subpixels made up of first and second regions arranged side by side in the rubbing direction, the first region has a plurality of slit-shaped openings having a given inclination in a first direction with respect to the rubbing direction, and the second region has a plurality of slit-shaped openings having a given inclination in a second direction with respect to the rubbing direction.

It should be noted that the above embodiments can be changed in various ways without departing from the scope of the embodiments.

Further, the above embodiments can be modified or changed in a number of ways by those skilled in the art and are not limited to the accurate configurations and application examples described above.

What is claimed is:

1. A display device comprising:

a plurality of scan lines and a plurality of signal lines on one of a pair of substrates arranged opposed to each other, the plurality of scan lines and the plurality of signal lines extending in different directions;

a plurality of pixels on the one of the pair of substrates, each of the plurality of pixels having a pixel electrode and a common electrode;

wherein each of the plurality of the pixels includes sub-pixels comprising first and second regions arranged side by side in an orientation direction;

the first and second regions are partitioned respectively by the scan lines and signal lines;

the first region has a plurality of slit-shaped openings having a first inclination in a first direction that is inclined with respect to the orientation direction;

the second region has a plurality of slit-shaped openings having a second inclination in a second direction that is inclined with respect to the orientation direction;

the first direction is different from the second direction;

first opening ends, which are ends of the slit-shaped openings of the first region in an extension direction of the slit-shaped openings, are arranged side by side and extend in a first end direction that is different from the first direction, the first end direction being inclined with respect to the first direction by a first given inclination;

second opening ends, which are ends of the slit-shaped openings of the second region in the extension direction, are arranged side by side and extend in a second end direction that is different from the second direction, the second end direction being inclined with respect to the second direction by a second given inclination;

the first given inclination is different from the second given inclination; and the first end direction is different from the second end direction.

2. The display device according to claim 1, wherein a magnitude of inclination of the slit-shaped openings of the first region with respect to the orientation direction is the same as the magnitude of inclination of the slit-shaped openings of the second region with respect to the orientation direction.

3. The display device according to claim 2, wherein the magnitude of inclination with respect to the orientation direction is five degrees.

4. The display device according to claim 2, wherein an inclination of the orientation direction with respect to the row direction is ten degrees.

5. The display device according to claim 4, wherein one pixel includes three sub-pixels.

6. The display device according to claim 1, wherein the first opening ends in the first region and the second opening ends of the second region overlap a black matrix in a planar view.

7. The display device according to claim 1, wherein each of the signal lines includes:
   a first portion routed along one side of the first region,
   a second portion routed along one side of the second region, and
   a third portion adapted to connect, in a crank form, the first and second portions.

8. The display device according to claim 7, wherein the signal line includes:
   a fourth portion adapted to connect, in a crank form, the second portion of one pixel and the first portion of another pixel adjacent to the one pixel.

9. The display device according to claim 1, wherein an aperture ratio of the first region is the same as that of the second region.

10. The display device according to claim 1, wherein a gravity center of the first region is aligned with that of the second region along the pixel arrangement direction.

11. The display device according to claim 1, wherein the first and second regions are arranged repeatedly along the pixel arrangement direction in which the first and second regions are arranged side by side.

12. The display device according to claim 1, wherein a first end length is a length of each of the ends of the slit-shaped openings in the first region, in a third direction perpendicular to a direction in which the scan lines extend,
   a second end length is a length of each of the ends of the slit-shaped openings in the second region in the third direction, and
   the first end length is different from the second end length.

13. The display device according to claim 1, wherein a first pixel electrode corresponding to the first region includes rectangular portions respectively extending from the first opening ends in the orientation direction, such that a pair of opposing sides of each rectangular portion is parallel to the orientation direction.

14. The liquid crystal display device according to claim 13, wherein a second pixel electrode corresponding to the second region includes rectangular portions respectively extending from the second opening ends in the orientation direction.

* * * * *